United States Patent
Liu (10) Patent No.: US 9,857,896 B2
(45) Date of Patent: Jan. 2, 2018

(54) TOUCH CONTROL METHOD AND ELECTRONIC DEVICE

(75) Inventor: Junfeng Liu, Beijing (CN)

(73) Assignees: LENOVO (BEIJING) CO., LTD., Haidian District, Beijing (CN); BEIJING LENOVO SOFTWARE LTD, Haidian District, Beijing (CN)

( * ) Notice: Subject to any disclaimer, the term of this patent is extended or adjusted under 35 U.S.C. 154(b) by 200 days.

(21) Appl. No.: 13/992,494

(22) PCT Filed: Dec. 5, 2011

(86) PCT No.: PCT/CN2011/083459
§ 371 (c)(1),
(2), (4) Date: Jun. 7, 2013

(87) PCT Pub. No.: WO2012/075916
PCT Pub. Date: Jun. 14, 2012

(65) Prior Publication Data
US 2013/0271416 A1   Oct. 17, 2013

(30) Foreign Application Priority Data

Dec. 9, 2010  (CN) .......................... 2010 1 0594981

(51) Int. Cl.
*G06F 3/041*  (2006.01)
*G06F 3/0488*  (2013.01)

(52) U.S. Cl.
CPC .......... *G06F 3/0412* (2013.01); *G06F 3/0488* (2013.01)

(58) Field of Classification Search
CPC .. G06F 3/0488; G06F 3/04883; G06F 3/0483; G06F 3/0416; G06F 3/044; G06F 2200/1614; G06F 2203/04808
See application file for complete search history.

(56) References Cited

U.S. PATENT DOCUMENTS 8,154,529 B2   4/2012 Sleeman et al.
8,212,788 B2 *  7/2012 Lam .................... G06F 3/04883
345/173

(Continued)

FOREIGN PATENT DOCUMENTS

CN   101419524   4/2009
CN   101739208   6/2010
(Continued)

OTHER PUBLICATIONS

First Office Action dated May 10, 2013 in corresponding Chinese priority application 201010594981.9 (14 pages including English translation).

(Continued)

*Primary Examiner* — Bryan Earles
(74) *Attorney, Agent, or Firm* — Brinks Gilson & Lione; G. Peter Nichols (57) ABSTRACT

A touch control method and electronic apparatus are described. The method includes a touch sensing unit on which an operational body carries out a continuous touch operation. The method includes determining a first coordinate of a first touch point on the touch sensing unit corresponding to the operational body at a first moment; determining a first operational area including the first coordinate on the touch sensing unit according to the first coordinate; determining a second coordinate of a second touch point on the touch sensing unit corresponding to the operational body at a second moment; obtaining a moving vector from the first touch point to the second touch point according to the first coordinate and the second coordinate; deciding whether the second coordinate is within the first operational area to generate a decision result; and executing a command corresponding to the moving vector according to the decision result.

13 Claims, 4 Drawing Sheets

(56) References Cited

U.S. PATENT DOCUMENTS

| | | | |
|---|---|---|---|
| 2006/0025218 A1* | 2/2006 | Hotta | A63F 13/06 463/37 |
| 2007/0075985 A1* | 4/2007 | Niida | G06F 3/0488 345/173 |
| 2008/0192020 A1* | 8/2008 | Kang et al. | 345/173 |
| 2008/0316183 A1* | 12/2008 | Westerman | G06F 3/0416 345/173 |
| 2009/0109184 A1 | 4/2009 | Kim et al. | |
| 2009/0160804 A1* | 6/2009 | Chang | G06F 3/03547 345/173 |
| 2009/0183930 A1* | 7/2009 | Yang | G06F 3/04845 178/18.03 |
| 2010/0127997 A1 | 5/2010 | Park et al. | |
| 2010/0289754 A1 | 11/2010 | Sleeman et al. | |
| 2010/0321319 A1* | 12/2010 | Hefti | G06F 3/04883 345/173 |
| 2011/0084985 A1* | 4/2011 | Kojima | 345/650 |
| 2011/0205248 A1 | 8/2011 | Honda et al. | |
| 2012/0235937 A1 | 9/2012 | Sleeman et al. | |

FOREIGN PATENT DOCUMENTS

| | | | |
|---|---|---|---|
| CN | 101853100 | 10/2010 | |
| CN | 101887323 | 11/2010 | |
| WO | WO 2010/050475 | 5/1920 | |
| WO | WO 2010050475 A1 * | 5/2010 | G06F 3/048 |

OTHER PUBLICATIONS

PCT/CN2011/083459 International Preliminary Report on Patentability dated Jun. 12, 2013 (14 pages).

Second Office Action dated Jan. 26, 2014 in corresponding Chinese priority application 201010594981.9 (12 pages including English translation).

Third Office Action dated Jul. 10, 2014 in corresponding Chinese priority application 201010594981.9 (4 pages including English translation).

PCT/CN2011/083459 International Search Report dated Mar. 8, 2012 (4 pages including 2 page English translation).

* cited by examiner

TOUCH CONTROL METHOD AND ELECTRONIC DEVICE

This application claims priority to International Application No. PCT/CN2011/083549 filed Dec. 5, 2011 and to Chinese Patent Appln. 201010594981.9 filed Dec. 9, 2010, the entire contents of each are incorporated herein by reference.

BACKGROUND

The present invention relates to touch control method for electronic apparatus and the corresponding electronic apparatus.

Recently, various electronic apparatus such as cellular phone, portable music player and portable computer have become widespread use. In these portable electronic apparatus, a touch sensing unit for accepting the input of the user is generally comprised to facilitate the operation of the user. The touch sensing unit may comprise a touch sensing region composed of sensing elements such as a capacitor type touch sensor or a resistor type touch sensor or the like. The user may carry out an action such as clicking, double-clicking, dragging or the like on the touch control region to implement a corresponding control function.

However, with the development of the technology, the processing capacity of the processor increases, the functions that can be provided to the user by the portable electronic apparatus increases continuously. Simple touch operation such as clicking, double-clicking as mentioned above can't satisfy the more and more versatile operational demand of the user. The operation needing a finger to move on the touch sensing unit such as dragging comes into wide use.

However, in the conventional electronic apparatus, for example, when the finger is moved on the touch sensing unit to magnify/reduce a display object, the precision of the magnify/reduce operation generally can't be controlled accurately by moving the finger. Further, for example, when the display object is moved by moving the finger on the touch sensing unit, the speed for moving the display object generally can't be controlled accurately by moving the finger.

Further, when the user needs to operate the electronic apparatus while holding the electronic apparatus, moving the finger on the touch sensing unit to perform a corresponding control input usually brings inconvenience to the user operating the electronic apparatus single-handed.

SUMMARY

The purpose of the embodiments of the present invention is to provide a touch control method for electronic apparatus and corresponding electronic apparatus to solve the above problem.

The embodiment of the present invention provides a touch control method applied to an electronic apparatus. The electronic apparatus comprises a touch sensing unit. An operational body performs a continuous touch operation on the touch sensing unit. The touch control method comprises: determining a first coordinate of a first touch point on the touch sensing unit corresponding to the operational body; determining a first operational region including the first coordinate on the touch sensing unit according to the first coordinate; determining a second coordinate of a second touch point on the touch sensing unit corresponding to the operational body at a second moment; obtaining a moving vector from the first touch point to the second touch point according to the first coordinate and the second coordinate; deciding whether the second coordinate is within the first operational region to generate a decision result; and executing a command corresponding to the moving vector according to the decision result.

Another embodiment of the present invention provides an electronic apparatus comprising: at least one touch sensing unit each configured to accept a continuous touch operation of an operational body, determine a first coordinate of a first touch point of the operational body at a first moment during the continuous touch operation, and determine a second coordinate of a second touch point of the operational body at a second moment during the continuous touch operation; a processing unit configured to determine a first operational region including the first coordinate in the corresponding touch sensing unit according to the first coordinate determined by each touch sensing unit, and obtain a moving vector from the first touch point to the second touch point in the corresponding touch sensing unit according to the first coordinate and the second coordinate determined by each touch sensing unit; a deciding unit configured to decide whether the second coordinate is within the first operational region in each touch sensing unit to generate a decision result; and a control unit configured to execute a command corresponding to the moving vector according to the decision result.

With the scheme provided by the above-described embodiments of the present invention, an operation such as magnifying, reducing, moving and rotating or the like can be executed to the content data displayed only by carrying out a tiny shifting input such as rolling the operational body (e.g., a finger) with the touch point at the first moment as center without moving the finger repeatedly with a long distance. Further, since a tiny shifting input such as rolling the finger is adopted, an accurate control on the corresponding operation can be implemented easily so as to facilitate the operation of the user.

BRIEF DESCRIPTION OF THE DRAWINGS

In order to describe the technical solutions of the embodiments of the invention more clearly, the accompanying drawings necessary for the description of the embodiments will be explained briefly below. The accompanying drawings in the following description are only exemplary embodiments of the invention.

DETAILED DESCRIPTION

Hereinafter, the preferred embodiments of the invention will be described detailedly with reference to the accompanying drawings. It is noticed that in the specification and accompanying drawings, substantially same steps and elements are represented by same reference numbers, and the repetitive explanation on these steps and elements would be omitted.

In the following embodiments of the present invention, the electronic apparatus refers to an apparatus capable of communicating with other apparatus. The concrete form of the electronic apparatus includes, but not limited to the mobile telephone, the personal computer, the digital camera, the personal digital assistant, the portable computer and the gaming machine and so on. The electronic apparatus comprises a touch sensing unit. Touch sensing elements such as a pressure-sensitive touch panel, electrostatic touch panel or a capacitive touch panel may be included in the touch sensing unit. The type of the touch sensing elements does not make restriction to the embodiments of the present invention.

Figure 1:
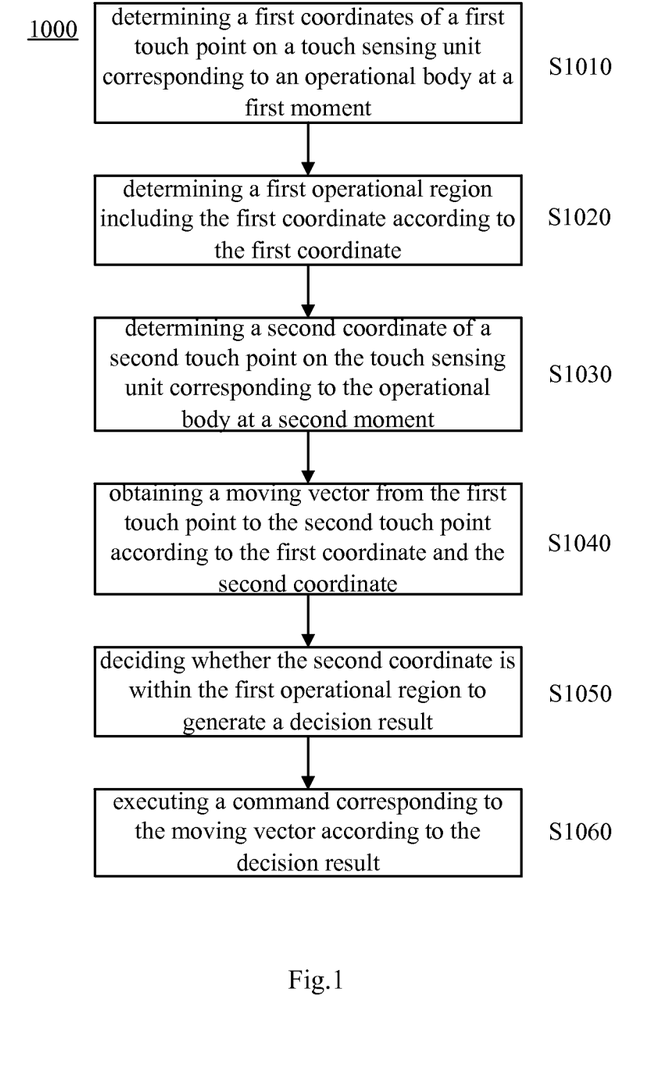
FIG. 1 is a flow chart illustrating the touch control method according to the embodiment of the present invention.

FIG. 1 is a flow chart illustrating the touch control method 1000 according to the embodiment of the present invention. Hereinafter, the touch control method according to the embodiment of the present invention will be described with reference to FIG. 1.

The touch control method 1000 may be used for the electronic apparatus comprising the touch sensing unit. An operational body performs a continuous touch operation on the touch sensing unit. As shown in FIG. 1, in the step S1010, a first coordinate of a first touch point on the touch sensing unit corresponding to the operational body at a first moment is determined. For example, a sensing region on the touch sensing unit corresponding to the operational body at the first moment may be obtained. Then, a point in the sensing region is selected as the first touch point according to a presetting, and the first coordinate of the first touch point is obtained. Preferably, the area and/or the shape of the sensing region may be obtained, and the coordinate of the geometric centre of the sensing region may be determined as the first coordinate according to the area and/or the shape of the sensing region. Alternatively, a point with strongest sensing parameter value on the touch sensing unit may be selected as the first touch point and the coordinate of this point may be obtained as the first coordinate. The first moment may be a predetermined moment during the continuous touch operation, e.g., the start moment of the continuous touch operation.

In the step S1020, a first operational region including the first coordinate is determined on the touch sensing unit according to the first coordinate. For example, the first operational region may be a circular region with the first touch point as the center and with a predetermined value as radius or a rectangle region with a predetermined value as side length, and so on. Further, in the case of obtaining the area of the sensing region in the step S1010, the first operational region including the first coordinate is determined on the touch sensing unit according to the first coordinate and the area of the sensing region. In particular, the area of the first operational region can be determined according to the area of the sensing region. In the case that the operational body is a finger, the area of the first operational region can be determined based on a presetting according to the area of finger on the sensing region on the touch sensing unit with the first coordinate as the center. For example, the area of the first operational region is pre-set to twice of the area of the sensing region. Thereby, when a person with a thinner finger operates the electronic apparatus, since the area of the sensing region is relative small, the first operational region is likely relative small. And when a person with a thicker finger operates the electronic apparatus, since the area of the sensing region is relative large, the first operational region is likely relative large. And when the electronic apparatus is operated with one finger, the first operational region is likely relative small. And when the electronic apparatus is operated with plural fingers, the first operational region is likely relative large. Alternatively, in the case of obtaining the shape of the sensing shape in the step S1010, the first operational shape including the first coordinate is determined on the touch sensing unit according to the first coordinate and the shape of the sensing shape. In particular, the shape of the first operational region can be determined according to the shape of the sensing region. In the case that the operational body is a finger, the shape of the first operational region can be determined based on a presetting according to the shape of finger on the sensing region on the touch sensing unit with the first coordinate as the center. For example, the first operational region is pre-set to a region extending a predetermined value outward from the boundary of the sensing region. Thereby, the shape of the first regions generated when different users carry out touch operations on the touch sensing unit may be different. And the shape of the first operational region when the electronic apparatus is operated with one finger and the shape of the first operational region when the electronic apparatus is operated with plural fingers may be different.

In the step S1030, a second coordinate of a second touch point on the touch sensing unit corresponding to the operational body at a second moment is determined. Similar to the first coordinate, for example, the sensing region on the touch sensing unit corresponding to the operational body at the second moment can be obtained. Then, a point in the sensing area is selected as the second touch point according to a presetting, and the second coordinate of the second touch point is obtained. No more details will be described here for the sake of briefness. The second moment may be a predetermined moment during the continuous touch operation. Alternatively, the operational body on the touch sensing unit can be detected at a predetermined time interval and the coordinate of the touch point on the touch sensing unit corresponding to the operational body is determined as the second coordinate of the second touch point, that is, the second moment can be a multiplied moment of the predetermined time interval.

In the step S1040, a moving vector from the first touch point to the second touch point is obtained according to the first coordinate and the second coordinate. As explained in the above, during the continuous touch operation, the operational body on the touch sensing unit can be detected in a predetermined time interval, and the coordinate of the touch point on the touch sensing unit corresponding to the operational body is obtained as the second coordinate every time of detection, so as to obtain the moving vector at this moment. That is, a plurality of moving vectors may be obtained during the continuous touch operation, and these moving vectors have same start point.

In a step S1050, it is decided whether the second coordinate is within the first operational region and a decision result is generated. And finally, in a step S1060, a command corresponding to the moving vector is executed according to the decision result.

In the case of detecting the operational body on the touch sensing unit in a predetermined time interval during the continuous touch operation, since the obtained plurality of moving vectors have same start point, there are same reference point as executing the command corresponding to each moving vector, so as to be able to execute the plurality of commands better during the continuous touch operation.

The continuous touch operation may be a touch operation of continuous shift, continuous roll or the like of the operational body on the touch sensing unit. Hereinafter, description will be provided by taking the continuous roll of the finger on the touch sensing unit as example. FIGS. 2a to 2f are explanatory diagrams illustrating an exemplified situation of the continuous touch operation carried out on the touch sensing unit by the finger. FIG. 3 is an explanatory diagram illustrating an exemplified situation of obtaining a moving vector corresponding to the movement of the finger according to the coordinates of the touch point on the touch sensing unit corresponding to the finger during the continuous touch operation carried out on the touch sensing unit by the finger. Hereinafter, description will be provided by taking the operation of continuous roll of the finger on the touch sensing unit as example with reference to FIGS. 2a to 2f and FIG. 3.

Figure 2A:
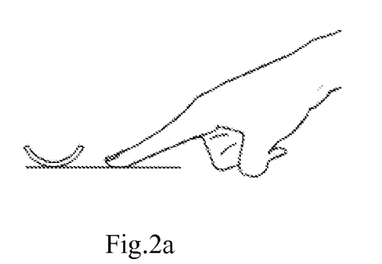
FIGS. 2a to 2f are explanatory diagrams illustrating an exemplified situation of the continuous touch operation carried out on the touch sensing unit by the finger.
Figure 2B:
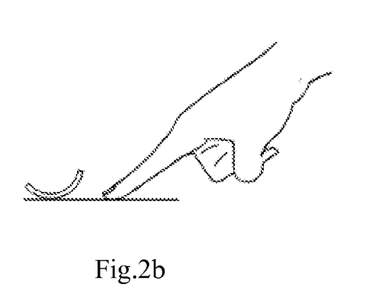
Figure 2C:
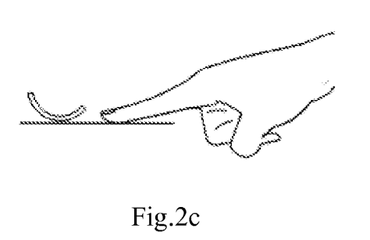
Figure 2D:
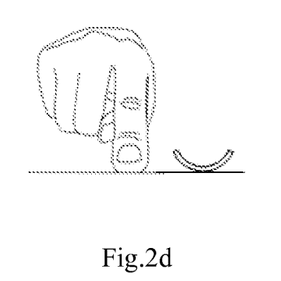
Figure 2E:
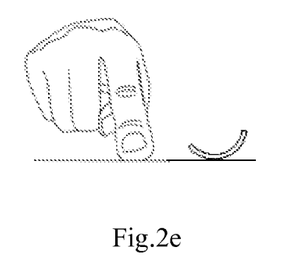
Figure 2F:
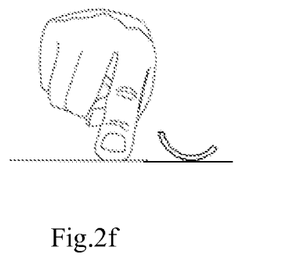
Figure 3:
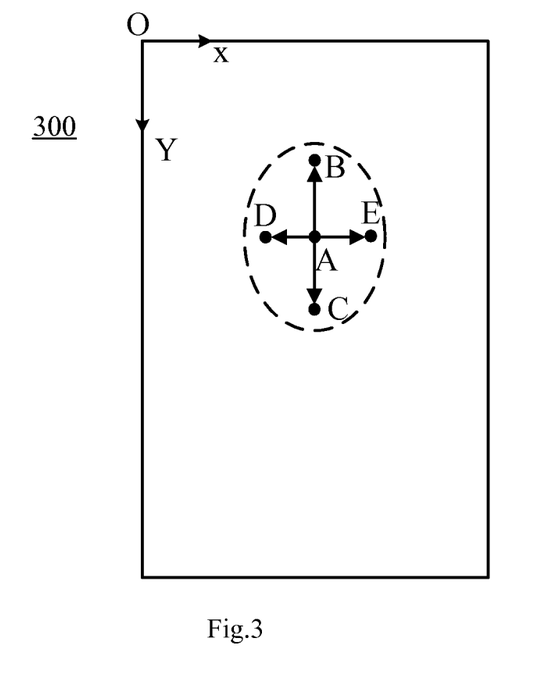
FIG. 3 is an explanatory diagram illustrating an exemplified situation of obtaining a moving vector corresponding to the movement of the finger according to the coordinates of the touch point on the touch sensing unit corresponding to the finger during the continuous touch operation carried out on the touch sensing unit by the finger.

In the embodiment shown in FIGS. 2a to 2f and FIG. 3, the first moment is a start moment of the continuous touch operation, for example, the moment at which the touch sensing unit detects the initial press of the finger thereon. FIG. 2a is a left view illustrating an exemplified situation of the continuous touch operation carried out on the touch sensing unit by the finger at the first moment. FIG. 2d is a front-view illustrating an exemplified situation of the continuous touch operation carried out on the touch sensing unit by the finger at the first moment.

FIG. 2b is a left view illustrating an exemplified situation of the touch operation of the finger on the touch sensing unit when one predetermined time interval is elapsed from the start moment. FIG. 2c is a left view illustrating an exemplified situation of the touch operation of the finger on the touch sensing when two predetermined time intervals are elapsed from the start moment. FIG. 2e is a front view illustrating an exemplified situation of the touch operation of the finger on the touch sensing when three predetermined time intervals are elapsed from the start moment. FIG. 2f is a front view illustrating an exemplified situation of the touch operation of the finger on the touch sensing when four predetermined time intervals are elapsed from the start moment. As shown in FIGS. 2a to 2f, in this embodiment, the finger takes the first touch point on the touch sensing unit at the start moment as a reference point, and rolls forward with respect to the reference point in the first predetermined time interval, rolls backward with respect to the reference point in the second predetermined time interval, rolls leftward with respect to the reference point in the third predetermined time interval, and rolls rightward with respect to the reference point in the fourth predetermined time interval. That is, the finger carries out a continuous touch operation on the touch sensing unit during the first to the fourth predetermined time intervals without leaving the touch sensing unit.

FIG. 3 is an explanatory diagram illustrating an exemplified situation of obtaining a moving vector corresponding to the movement of the finger according to the coordinates of the touch point on the touch sensing unit corresponding to the finger at the start moment shown in FIGS. 2a to 2f and the moments elapsed the first to the fourth predetermined time intervals respectively. That is, FIG. 3 shows the change of the position of the touch point detected by the touch sensing unit during the period that the finger performs the continuous roll operation shown in FIGS. 2a to 2f on the touch sensing unit.

As shown in FIG. 3, in a reference coordinate system with the touch sensing unit 300 as reference (for example, with the top left corner of the touch sensing unit 300 as the origin O of the coordinate system), it is assumed that the width direction of the touch sensing unit 300 is X-axis and the length direction thereof is Y-axis.

In the step S1010 of the method 1000, a first coordinate of a first touch point on the touch sensing unit corresponding to the operational body at a first moment is determined. For example, the corresponding first coordinate (x1, y1) of the first touch point A when the finger presses on the touch sensing unit 300 at the start moment may be determined.

In the step S1020, a first operational region including the first coordinate is determined on the touch sensing unit according to the first coordinate. For example, the first operational region may be predetermined as an elliptic region, and the long radius on the Y-axis and the short radius on the X-axis of the elliptic region are set. According to the first coordinate (x1, y1), the elliptic region with the first coordinate (x1, y1) as the center and having the set long radius and short radius is determined as the first operational region on the touch sensing unit, as the elliptic region whose boundary is shown by the dotted line in FIG. 3.

In the step S1030, a second coordinate of a second touch point on the touch sensing unit corresponding to the operational body at a second moment is determined. As described above, the second coordinate of the second touch point on the touch sensing unit corresponding to the operational body can be determined in a predetermined time interval. For example, at a moment elapsed a predetermined time interval from the start moment, the second coordinate (x2, y2) of the second touch point B on the touch sensing unit 300 corresponding to the finger is determined.

In the step S1040, a moving vector from the first touch point to the second touch point is obtained according to the first coordinate and the second coordinate. For example, a moving vector $\overrightarrow{AB}$ from the first touch point A to the second touch point B is obtained according to the first coordinate (x1, y1) and the second coordinate (x2, y2).

In the step S1050, it is decided whether the second coordinate is within the first operational region, and a decision result is generated. For example, it is decided whether the second coordinate (x2, y2) of the second touch point B goes beyond the first ellipse operational region shown by the dotted line in FIG. 3.

Finally, in the step S1060, a command corresponding to the moving vector is executed according to the decision result. For example, in the case that the electronic apparatus further comprises a display unit displaying a content data to the user, as shown in FIG. 3, the decision result represents that the second coordinate (x2, y2) of the second touch point B is within the first ellipse operational region shown in dotted line, and at this time the first command is executed to the content data displayed by the display unit according to the moving vector $\overrightarrow{AB}$. The first command may comprise at least one of the following commands: magnifying the content data, reducing the content data, moving the content data, rotating the content data. The specific type of the first command does not make any restriction to the embodiments of the present invention. The display unit may comprise a display screen of types such as TFT, OLED or the like, and may comprise a display screen with low power consumption such as display screen of types of Memory LCD, E-Ink or the like. The type of the display screen does not make any restriction to the embodiments of the present invention.

In particular, the length and the direction of the moving vector can be obtained, and a command parameter can be determined according to the length and the direction of the moving vector. Thereby, the first command is executed according to the command parameter. For example, when the direction of the moving vector is preset as the negative direction of Y-axis, the first command is magnifying content data; when the direction of the moving vector is preset as the positive direction of Y-axis, the first command is reducing content data; when the direction of the moving vector is preset as the negative direction of X-axis, the first command is moving content data leftwards; and when the direction of the moving vector is preset as the positive direction of X-axis, the first command is moving content data rightwards. As shown in FIG. 3, the direction of the moving vector $\overrightarrow{AB}$ is pointed to the negative direction of Y-axis from the first touch point A in the touch sensing unit 300, and the length of the moving vector is |AB|. Therefore, it can be determined that the first command corresponding to the moving vector $\overrightarrow{AB}$ is magnifying content data, and the content data is magnified by a multiple corresponding to the length |AB|. Hence, the first command is executed to the content data according to the determined command parameter.

Further, when it is detected that the continuous touch operation on the touch sensing unit does not end, the step S1030 to the step S1060 in the method 1000 can be repeated to continue to execute the corresponding command according to the touch operation of the user. For example, at a moment elapsed two predetermined time intervals from the start moment, the third coordinate (x3, y3) of the third touch point C on the touch sensing unit 300 corresponding to the finger is determined. A moving vector $\overrightarrow{AC}$ from the first touch point A to the third touch point C is obtained according to the first coordinate A (x1, y1) and the third coordinate C (x3, y3). It is decided whether the third coordinate (x3, y3) of the third touch point C goes beyond the first ellipse operational region shown in dotted line in FIG. 3. In the case as shown in FIG. 3, the decision result represents that the third coordinate (x3, y3) of the third touch point C is within the first ellipse operational region shown in dotted line, and the first command is executed to the content data displayed by the display unit according to the moving vector $\overrightarrow{AC}$ at this time. In particular, for example, when the direction of the moving vector is preset as the negative direction of Y-axis, the first command is magnifying content data; when the direction of the moving vector is preset as the positive direction of Y-axis, the first command is reducing content data; when the direction of the moving vector is preset as the negative direction of X-axis, the first command is moving content data leftwards; and when the direction of the moving vector is preset as the positive direction of X-axis, the first command is moving content data rightwards. As shown in FIG. 3, the direction of the moving vector $\overrightarrow{AC}$ is pointed to the positive direction of Y-axis from the first touch point A in the touch sensing unit 300, and the length of the moving vector is |AC|. Therefore, it is determined that the first command corresponding to the moving vector $\overrightarrow{AC}$ is reducing the content data, and the content data is reduced by a multiple corresponding to the length |AC|. Hence, the first command is executed to the content data according to the determined command parameter.

When the situation that the continuous touch operation on the touch sensing unit ends after two predetermined time intervals are elapsed is detected, the content data to which the first command immediately before the end moment is executed may be displayed on the display unit. For example, the content data reduced by a multiple corresponding to the length |AC| is displayed on the display unit. Further, in the case that the first command is magnifying the content data or reducing the content data, when the continuous touch operation ends, the content data to which the first command is executed is displayed with the data corresponding to the first coordinate in the content data as center. For example, when the continuous touch operation ends, the content data to which a reduction of a multiple corresponding to the length |AC| is executed is displayed with the data corresponding to the first coordinate A (x1, y1) in the content data as center.

Alternatively, when it is detected that the continuous touch operation on the touch sensing unit does not end, the step S1030 to the step S1060 in the method 1000 can be repeated to continue to execute the corresponding command according to the touch operation of the user. For example, at a moment elapsed four predetermined time intervals from the start moment, the fourth coordinate (x4, y4) of the fourth touch point D on the touch sensing unit 300 corresponding to the finger is determined. The moving vector $\overrightarrow{AD}$ from the first touch point A to the fourth touch point D is obtained according to the first coordinate A (x1, y1) and the fourth coordinate D (x4, y4). It is decided whether the fourth coordinate (x4, y4) of the fourth touch point D goes beyond the first ellipse operational region shown in dotted line in FIG. 3. In the case as shown in FIG. 3, the decision result represents that the fourth coordinate (x4, y4) of the fourth touch point C is within the first ellipse operational region shown in dotted line, and the first command is executed to the content data displayed by the display unit according to the moving vector $\overrightarrow{AD}$ at this time. In particular, for example, when the direction of the moving vector is preset as the negative direction of Y-axis, the first command is magnifying the content data; when the direction of the moving vector is preset as the positive direction of Y-axis, the first command is reducing the content data; when the direction of the moving vector is preset as the negative direction of X-axis, the first command is moving the content data leftwards; and when the direction of the moving vector is preset as the positive direction of X-axis, the first command is moving the content data rightwards. As shown in FIG. 3, the direction of the moving vector $\overrightarrow{AD}$ is pointed to the negative direction of X-axis from the first touch point A in the touch sensing unit 300, and the length of the moving vector is |AD|. Therefore, it is determined that the first command corresponding to the moving vector $\overrightarrow{AD}$ is moving the content data leftwards, and the content data is moved by a distance corresponding to the length |AD|. Hence, the first command is executed to the content data according to the determined command parameter.

When it is detected that the continuous touch operation on the touch sensing unit does not end yet, the step S1030 to the step S1060 in the method 1000 can be repeated to continue to execute the corresponding command according to the touch operation of the user. For example, at a moment elapsed four predetermined time intervals from the start moment, the fifth coordinate (x5, y5) of the fifth touch point E on the touch sensing unit 300 corresponding to the finger is determined. A moving vector $\overrightarrow{AE}$ from the first touch point A to the fifth touch point E is obtained according to the first coordinate A (x1, y1) and the fifth coordinate E (x5, y5). It is decided whether the fifth coordinate (x5, y5) of the fifth touch point E goes beyond the first ellipse operational region shown in dotted line in FIG. 3. In the case as shown in FIG. 3, the decision result represents that the fifth coordinate (x5, y5) of the fifth touch point E is within the first ellipse operational region shown in dotted line, and the first command is executed to the content data displayed by the display unit according to the moving vector $\overrightarrow{AE}$ at this time. In particular, for example, when the direction of the moving vector $\overrightarrow{AE}$ is preset as the negative direction of Y-axis, the first command is magnifying the content data; when the direction of the moving vector is preset as the positive direction of Y-axis, the first command is reducing the content data; when the direction of the moving vector is preset as the negative direction of X-axis, the first command is moving content data leftwards; and when the direction of the moving vector is preset as the positive direction of X-axis, the first command is moving content data rightwards. As shown in FIG. 3, the direction of the moving vector $\overrightarrow{AE}$ is pointed to the positive direction of X-axis from the first touch point A in the touch sensing unit 300, and the length of the moving vector is |AE|. Therefore, it is determined that the first command corresponding to the moving vector $\overrightarrow{AE}$ is moving the content data rightwards, and the content data is moved by a distance corresponding to the length |AE|. Hence, the first command is executed to the content data according to the determined command parameter. When the situation that the continuous touch operation on the touch sensing unit ends after four predetermined time intervals are elapsed is detected, the method 1000 as shown in FIG. 1 can end.

During the continuous touch operation as shown in FIGS. 2a-2f and FIG. 3, since the plurality of moving vectors have same start point (the first touch point A (x1, y1) shown in FIG. 3), so that there may be same reference point as executing the plurality of command corresponding to the moving vector, so as to be able to execute the plurality of commands corresponding to continuous touch operation better. For example, in the case that the user wants to magnify the content data displayed in the display unit, he can move his finger from the first touch point A to the second touch point B. And when the user finds that the magnification factor corresponding to the length |AB| is too large or the speed of magnification is too fast, he can move his finger to an intermediate point (not shown) between the first touch point A and the second touch point B along the positive direction of Y-axis from the second touch point B. Hence, a magnifying command of the corresponding multiple and/or velocity is executed according to the vector from the first touch point A to the intermediate point, instead of executing a corresponding reducing command according to a vector from the second touch point B to the intermediate point. Therefore, when the user performs a plurality of adjusting operations to the content data displayed, the reference objects of the plurality of adjusting operations are same, so as to increase the accuracy of the plurality of operations, as compared to the conventional case of executing corresponding command by moving the finger, especially when a plurality of continuous touch operations are carried out, a result desired by the user can be achieved more accurately with a shorter time through the touch control method in the present embodiment.

In the present embodiment, description is provided by taking the first command being magnifying/reducing the display content and moving the display content as example. But the embodiments of the present invention are not limited thereto. As mentioned above, for example, the first command may also be rotating the content data displayed. For example, the first command may instruct to rotate the content data displayed leftwards/rightwards. Alternatively, in the case that the content data displayed is a virtual 3D display object, the first command may also instruct to rotate the virtual 3D display object with the Y-axis as the axis of rotation or with the X-axis as the axis of rotation in a manner that one end being toward to the user and the other end being apart from the user.

Further, in the present embodiment, description is provided by taking one finger on the touch sensing unit as example, but the embodiments of the present invention is not limited thereto. The touch control method according to the embodiment of the present invention may be implemented by plural fingers. And the corresponding first command when it is detected that the operational body is plural fingers may be different from the corresponding first command when the operational body is one finger. For example, the corresponding first command when the operational body is one finger may be magnifying/reducing the content data displayed, and the corresponding first command when the operational body is plural fingers may be rotating the content data displayed. Alternatively, the corresponding first command when the operational body is one finger may be magnifying/reducing the content data displayed at a first speed, and the corresponding first command when the operational body is plural fingers may be magnifying/reducing the content data displayed at a second speed.

FIG. 3 illustrates the case that the coordinate of the touch point is within the first ellipse operational region shown by the dotted line, alternatively, the coordinate of the touch point may be out of the first operational region. In particular, when the decision result indicates that the second coordinate is not within the first operational region, a second command different from the first command is executed to the content data according to the moving vector. In the present embodiment, the first command being different from the second command means that the first command and the second command are commands of different types. For example, the first command is magnifying/reducing the content data displayed, and the second command is dragging the display object selected.

Figure 4:
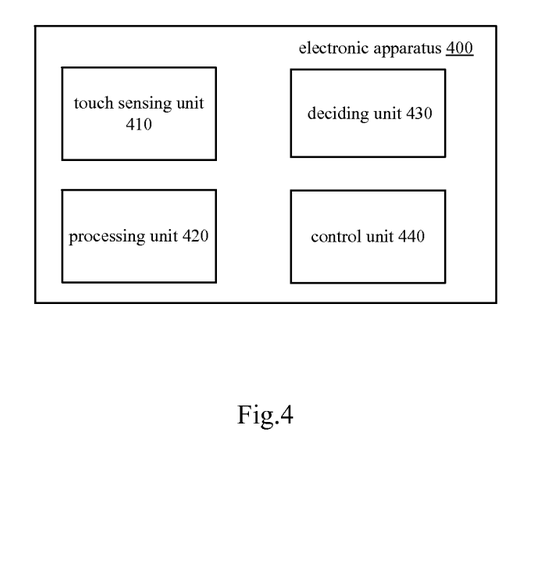
FIG. 4 is a schematic structured block view of the electronic apparatus according to the embodiment of the present invention.

Hereinafter, the electronic apparatus of present embodiment of the invention is described with reference to FIG. 4. FIG. 4 is a schematic structured block view of the electronic apparatus 400 according to the embodiment of the present invention. As shown in FIG. 4, the electronic apparatus 400 of the present embodiment comprises a touch sensing unit 410, a processing unit 420, a deciding unit 430 and a control unit 440. The respective modules of the electronic apparatus 400 execute the above-described respective steps/functions of the display method of FIG. 1, therefore, no more details will be described for the sake of briefness.

For example, the touch sensing unit 410 can accept the continuous touch operation of the operational body, and determine the first coordinate of the first touch point of the operational body at a first moment during the continuous touch operation, and determine the second coordinate of the second touch point of the operational body at a second moment during the continuous touch operation. Further, the touch sensing unit 410 can also obtain the area and/or the shape of the sensing region corresponding to the operational body at the first moment.

The processing unit 420 can determine a first operational region including the first coordinate on the touch sensing unit according to the first coordinate, and obtain a moving vector from the first touch point to the second touch point according to the first coordinate and the second coordinate. The first operational area may be a circular area with the first touch point as the center and with a predetermined value as radius or a rectangle area with a predetermined value as side length, and so on. Alternatively, the processing unit 420 can determine the area and/or the shape of the first operational region according to the area and/or the shape of the sensing region obtained by the touch sensing unit 410.

The deciding unit 430 can decide whether the second coordinate is within the first operational region to generate a decision result. The control unit 440 can execute a command corresponding to the moving vector according to the decision result.

Although description is provided by taking the electronic apparatus 400 comprising one touch sensing unit 410 as example in the present embodiment, the electronic apparatus can comprise more than two touch sensing units in alternative embodiments. Each of the touch sensing units can accept the continuous touch operation of the operational body, and determine the first coordinate of the first touch point of the operational body at a first moment during the continuous touch operation, and determine the second coordinate of the second touch point of the operational body at a second moment during the continuous touch operation. That is, each of the touch sensing units determines a group of a first coordinate and a second coordinate with respect to the continuous touch operation carried out thereon. The processing unit can determine the first operational region including the first coordinate in the corresponding touch sensing unit according to the first coordinate determined by each touch sensing unit, and obtain the moving vector from the first touch point to the second touch point in the corresponding touch sensing unit according to the group of the first coordinate and the second coordinate determined by each touch sensing unit. That is, for the continuous touch operation carried out on each touch sensing unit, the processing unit can determine the first operational region including the first coordinate in the touch sensing unit according to the group of the first coordinate and the second coordinate determined by the touch sensing unit, and obtain the corresponding moving vector. The deciding unit can decide whether the second coordinate is within the first operational region in each touch sensing unit to generate a decision result. The control unit can execute the command corresponding to the moving vector according to the decision result.

That is, the touch control method as shown in FIG. 1 can be executed individually in more than two touch sensing units of the electronic apparatus. The continuous touch operation in the respective touch sensing unit can be carried out at same time or at different time. For example, when the touch sensing unit has two secondary touch sensing units of a first secondary touch sending unit and a second secondary touch sensing unit, in a driving game, the direction of the vehicle can be controlled by the left-right rolling of the fingers of the left hand in the first secondary touch sensing unit, and the speed of the vehicle can be controlled by the front-back rolling of the fingers of the right hand in the second secondary touch sensing unit.

Further, the first command and the second command corresponding to the moving vector in the respective touch sensing units may be different, and it will be explained in detail later. Further, according to specific requirement of design, the respective touch sensing unit can be formed on one touch panel, alternatively, the respective touch sensing units can be formed on a plurality of touch panels respectively.

Figure 5:
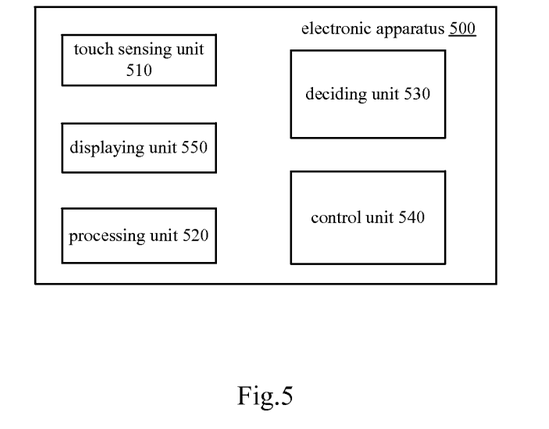
FIG. 5 is a schematic structured block view of the electronic apparatus according to another embodiment of the present invention.

Hereinafter, the electronic apparatus according to another embodiment of the invention will be explained with reference to FIG. 5. FIG. 5 is a schematic structured block view of the electronic apparatus 500 according to another embodiment of the present invention. As shown in FIG. 5, similar to the electronic apparatus 400, the electronic apparatus 500 comprises a touch sensing unit 510, a processing unit 520, a deciding unit 530 and a control unit 540. The touch sensing unit 510 can accept the continuous touch operation of the operational body, determine the first coordinate of the first touch point of the operational body at a first moment during the continuous touch operation, and determine the second coordinate of the second touch point of the operational body at a second moment during the continuous touch operation. The processing unit 520 can determine a first operational region including the first coordinate on the touch sensing unit according to the first coordinate, and obtain a moving vector from the first touch point to the second touch point according to the first coordinate and the second coordinate. The deciding unit 530 can decide whether the second coordinate is within the first operational region and generate a decision result. The control unit 540 can execute a command corresponding to the moving vector according to the decision result.

The electronic apparatus 500 in the present embodiment further comprises a display unit 550. The display unit 550 can display content data to the user. When the decision result indicates that the second coordinate is within the first operational region, the control unit 540 can execute the first command to the content data according to the moving vector. The first command may comprise at least one of the following commands: magnifying the content data, reducing the content data, moving the content data, and rotating the content data. And when the decision result indicates that the second coordinate is not within the first operational region, the control unit 540 can execute a second command different from the first command to the content data according to the moving vector. Whether the coordinate positioned on the edge of the first operational region belongs to the first operational region can be specified according to a particular demand.

Preferably, in the case that the first command is magnifying the content data or reducing the content data, when the continuous touch operation ends, the display unit can display the content data to which the first command is executed with the data corresponding to the first coordinate in the content data as center.

The display unit and the touch sensing unit can be provided as being overlapped with each other, or being incompletely overlapped. Further, in alternative embodiments, the electronic apparatus can comprise more than two touch sensing units. For example, the electronic apparatus can comprise two touch sensing units, and one touch sensing unit is provided as being overlapped with the display unit and the other touch sensing unit is provided without being overlapped with the display unit. The first command and the second command corresponding to the moving vectors in the touch sensing unit being overlapped with the display unit are different from the first command and the second command corresponding to the moving vectors in the touch sensing unit being not overlapped with the display unit. In particular, the first command corresponding to the moving vector in the touch sensing unit overlapped with the display unit may be magnifying/reducing command, and the second command may be dragging command. And the first command corresponding to the moving vector in the touch sensing unit not overlapped with the display unit may be moving command, and the second command may be rotating command.

In the electronic apparatus according to the present embodiment, operations such as magnifying, reducing, moving and rotating or the like can be executed to the content data displayed only by carrying out a tiny shifting input such as rolling the operational body (e.g., a finger) with the touch point at the first moment as center without moving the finger repeatedly with a long distance, so as to facilitate the operation of the user.

It should be noted that the respective steps of the method shown in FIG. 1 need not to be executed in the order shown. These steps can be executed reversely or in parallel. For example, the step of obtaining the moving vector from the first touch point to the second touch point according to the first coordinate and the second coordinate (step S1040) and the step of deciding whether the second coordinate is within the first operational region and generating the decision result(step S1050) can be executed at the same time, or the step S1050 can be executed first, then the step S1040 is executed. Further, as aforementioned, in the case that the continuous touch operation does not end, the method shown in FIG. 1 can be executed repeatedly. In the case that the operational body on the touch sensing unit is detected in predetermined time interval, the position of the operational body on the touch sensing unit at the start moment can be as the first touch point in one continuous touch operation, that is, all of the subsequently-obtained moving vectors have same start point. Therefore, when the method shown in FIG. 1 is executed repeatedly, the step S1010 and the step S1020 can be omitted, and only the step S1030 to the step S1060 are repeated.

Those skilled in the art can understand that the units and algorithm steps of respective examples described in combination with the embodiments disclosed in the specification can be implemented by electronic hardware, computer software or the combination of both, in order to explain the interchange ability of the hardware and the software, the constitution and steps of the respective examples are described generally according to the function in the above description. Whether the functions are executed by hardware or software is depending on the specific applications and design constraint of the technical solution. Those skilled in the art can implement the described function by using different methods for each specific application, and such implementations should not be regarded as beyond the scope of the invention.

Those skilled in the art can understand that various modifications, combinations, partial combinations and alternation can be made to the invention depending on the design need and other factors, so long as they are in the range of the attached claims and the equivalent ones.

What is claimed is:

1. A touch control method applied to an electronic apparatus comprising a touch sensing unit on which an operational body carries out a continuous touch operation, the method comprising:

determining a first coordinate of a first touch point on the touch sensing unit corresponding to the operational body at a first moment;

determining a first operational region including the first coordinate on the touch sensing unit according to the first coordinate;

determining a second coordinate of a second touch point on the touch sensing unit corresponding to the operational body at a second moment, wherein during a roll movement of the operational body from the first touch point to the second touch point, the first operational region remains unchanged;

obtaining a moving vector from the first touch point to the second touch point according to the first coordinate and the second coordinate;

deciding whether the second coordinate is within the first operational region to generate a decision result; and executing a command corresponding to the moving vector according to the decision result, wherein when the decision result indicates that the second coordinate is within the first operational region, selecting a predetermined type of command from at least a first type of command and a second type of command according to a direction of the moving vector, and executing different commands of the selected predetermined type of command to the content data according to a length of the moving vector and when the decision result indicates that the second coordinate is not within the first operational region, executing a third type of command to the content data according to direction of the moving vector such that functions of the first type of command, the second type of command, and the third type of command are different from each other.

2. The method according to claim 1, wherein the first moment is a start moment of the continuous touch operation; and the second moment is a multiple of a predetermined time interval.

3. The method according to claim 1, wherein, determining the first coordinate of the first touch point on the touch sensing unit corresponding to the operational body comprises:

obtaining a sensing region on the touch sensing unit corresponding to the operational body at the first moment;

selecting one point in the sensing region as the first touch point according to a presetting; and obtaining the first coordinate of the first touch point.

4. The method according claim 3, wherein obtaining the sensing region on the touch sensing unit corresponding to the operational body at the first moment comprises: obtaining area of the sensing region, determining the first operational region of the first coordinate on the touch sensing unit according to the first coordinate comprises: determining the first operational region including the first coordinate on the touch sensing unit according to the first coordinate and the area of the sensing region, wherein the area of the first operational region is determined according to the area of the sensing region.

5. The method according claim 3, wherein obtaining the sensing region on the touch sensing unit corresponding to the operational body at the first moment comprises: obtaining shape of the sensing region, determining the first operational region of the first coordinate on the touch sensing unit according to the first coordinate comprises: determining the first operational region including the first coordinate on the touch sensing unit according to the first coordinate and the shape of the sensing region, wherein the shape of the first operational region is determined according to the shape of the sensing region.

6. The method according to claim 1, wherein, the electronic apparatus further comprises a display unit configured to display content data to the user.

7. The method according to claim 6, wherein, the first type of command or the second type of command comprises at least one of the following commands: magnifying the content data, reducing the content data, moving the content data, and rotating the content data.

8. The method according to claim 7, wherein executing the selected type of command to the content data comprises:
obtaining length and direction of the moving vector;
determining a command parameter according to the length and the direction of the moving vector; and
executing the selected type of command according to the command parameter.

9. The method according to claim 7, wherein the selected type of command is magnifying the content data or reducing the content data, and the method further comprises:
displaying the content data to which the selected type of command is executed with the data in the content data corresponding to the first coordinate as center when the continuous touch operation ends.

10. An electronic apparatus, comprises:
at least one touch sensing unit, each touch sensing unit being configured to accept a continuous touch operation of an operational body, determine a first coordinate of a first touch point of the operational body at a first moment during the continuous touch operation, and determine a second coordinate of a second touch point of the operational body at a second moment during the continuous touch operation;
a processing unit configured to determine a first operational region including the first coordinate in the corresponding touch sensing unit according to the first coordinate determined by each touch sensing unit, and obtain a moving vector from the first touch point to the second touch point in the corresponding touch sensing unit according to the first coordinate and the second coordinate determined by each touch sensing unit, wherein during a roll movement of the operational body from the first touch point to the second touch point, the first operational region remains unchanged;
a deciding unit configured to decide whether the second coordinate is within the first operational region in each touch sensing unit to generate a decision result; and
a control unit configured to execute a command corresponding to the moving vector according to the decision result,
wherein when the decision result indicates that the second coordinate is within the first operational region, the control unit selects a predetermined type of command from at least a first type of command and a second type of command according to a direction of the moving vector and executes different commands of the selected predetermined type of command to the content data according to the length of the moving vector and when the decision result indicates that the second coordinate is not within the first operational region, the control unit executes a third type of command to the content data according to direction of the moving vector such that functions of the first type of command, the second type of command and the third type of command are different from each other.

11. The electronic apparatus according to claim 10, wherein
each touch sensing unit is further configured to obtain area and/or shape of a sensing region correspond to the operational body at the first moment,
the processing unit is further configured to determine the area and/or the shape of the first operational region in the corresponding touch sensing unit according to the area and/or the shape of the sensing region obtained by each touch sensing unit.

12. The electronic apparatus according to claim 10, further comprises:
a display unit configured to display content data to the user,
wherein, the first type of command or the second type of command comprises at least one of the following commands: magnifying the content data, reducing the content data, moving the content data, and rotating the content data.

13. The electronic apparatus according to claim 12, wherein, the selected type of command is magnifying the content data or reducing the content data, wherein
the display unit is further configured to display the content data to which the selected type of command is executed with the data in the content data corresponding to the first coordinate as center when the continuous touch operation ends.

* * * * *